July 30, 1935.  M. F. P. MURRAY  2,009,561
VANITY BOX
Filed Nov. 18, 1931  3 Sheets-Sheet 1
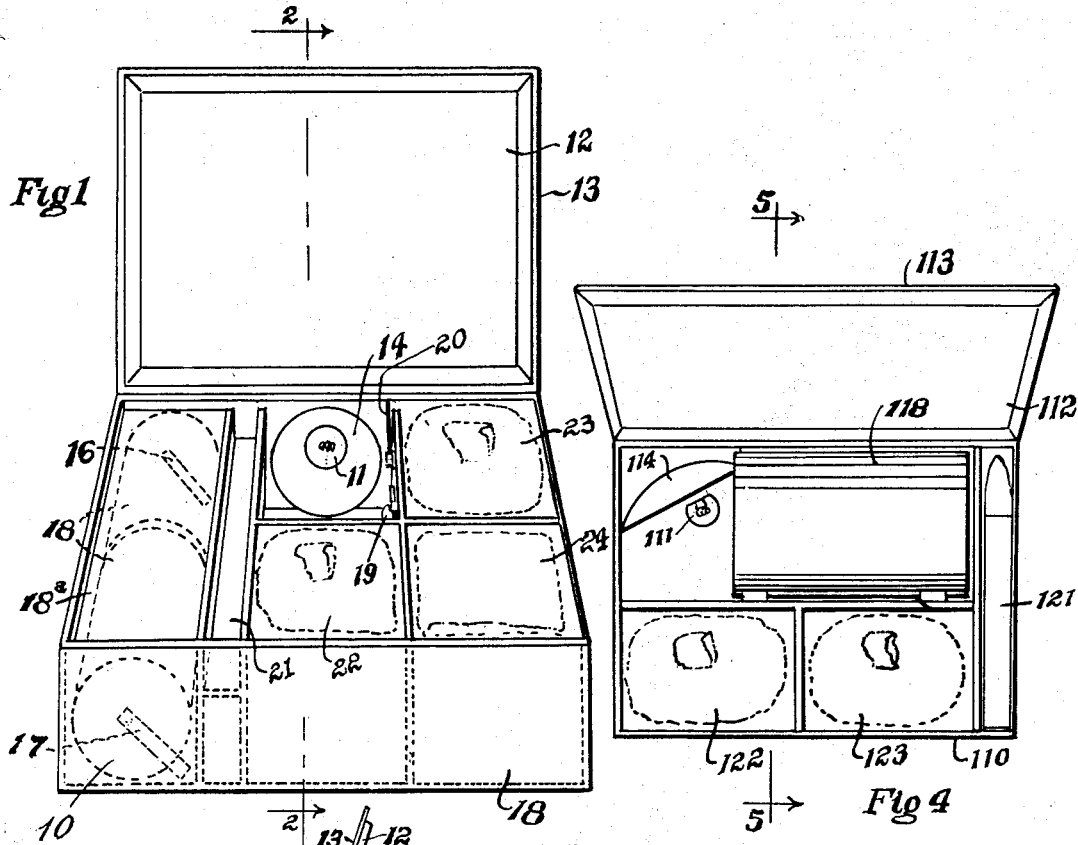
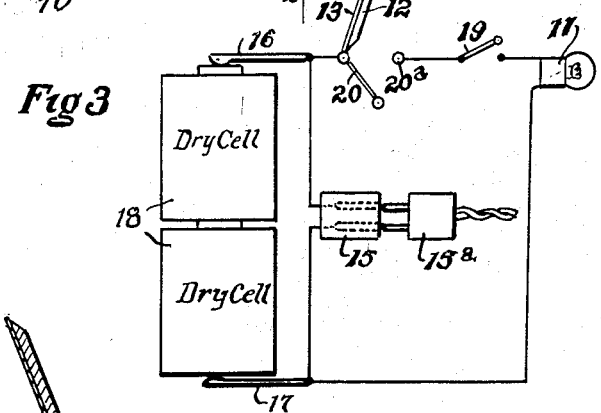
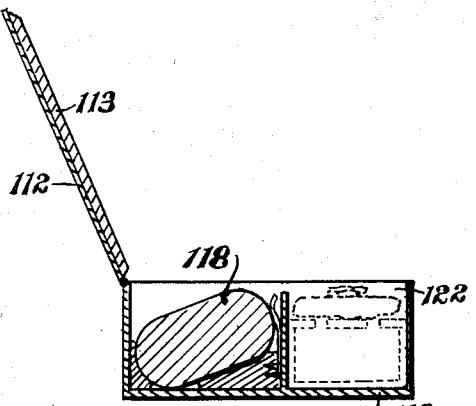
Inventor
May Frances Powell Murray
By Walter W. Burns
Attorney July 30, 1935.  M. F. P. MURRAY  2,009,561
VANITY BOX
Filed Nov. 18, 1931   3 Sheets-Sheet 2

Inventor
May Frances Powell Murray
By Walter W. Burns
Attorney

July 30, 1935.  M. F. P. MURRAY  2,009,561

VANITY BOX

Filed Nov. 18, 1931  3 Sheets-Sheet 3

Inventor
*May Frances Powell Murray*

By *Walter W. Burns*

Attorney

Patented July 30, 1935

2,009,561

UNITED STATES PATENT OFFICE 2,009,561

VANITY BOX

May Frances Powell Murray, Fairfax, Va.

Application November 18, 1931, Serial No. 575,879

1 Claim. (Cl. 240—6.45)

This invention relates to hand vanity boxes and is particularly intended for use in places where lighting conditions are not of the best.

The use of vanity boxes is very difficult in automobiles, particularly at night and in other places where the lighting is not properly arranged for such use. In the case of the automobile, the use of a bright light within, would, at night cause confusion to the operator.

The primary object of this invention is the provision of an improved vanity box having an illuminating device to illuminate the features of the user.

Another object of the invention is to provide a hand vanity box which has an electric light supplied by current either from a battery within itself or from a source of supply conducted to it by wires and supplied by current from either the automobile battery or a dry cell battery concealed in any appropriate place.

Another object of the invention is the provision of a vanity box having a mirror cover with recesses to receive cosmetics and a light provided with a reflecting surface to throw the greater part of its light away from the mirror and into the face of the user while the cosmetics in the recesses are being used.

Another object of the invention is the provision of a vanity box having a mirror on the lid, recesses for cosmetics, an electric light to illuminate the face of the user and means operated by the lid to close the circuit to the lamp when the lid is opened to expose the mirror and to open the circuit when the lid is closed.

Another and further object of this invention is the provision of a vanity box having an electric lamp, space for cosmetics, a mirror, the parts being so placed as to provide an unobstructed path for the light to the face of the user.

Another and still further object of this invention is the provision of a vanity box having an electric light, spaces for cosmetics, a mirror, provision for reversing the position of the electric light for right and left handed users.

Other and further objects of the invention will be apparent to those skilled in the art from a reading of the complete specification and claim.

Referring to the drawings wherein I have illustrated two embodiments of my invention, Figure 1 is a perspective view of a preferred form of my invention.

Figure 2 is a cross section on the line 2—2 of Figure 1.

Figure 3 is a diagrammatic view of the wiring for the light and connector.

Figure 4 is a perspective view from above of a modified form of my invention.

Figure 5 is a cross sectional view on the line 5—5 of Figure 4.

In the drawings, the same or similar characters refer to the same or similar parts throughout the views.

Figure 6:
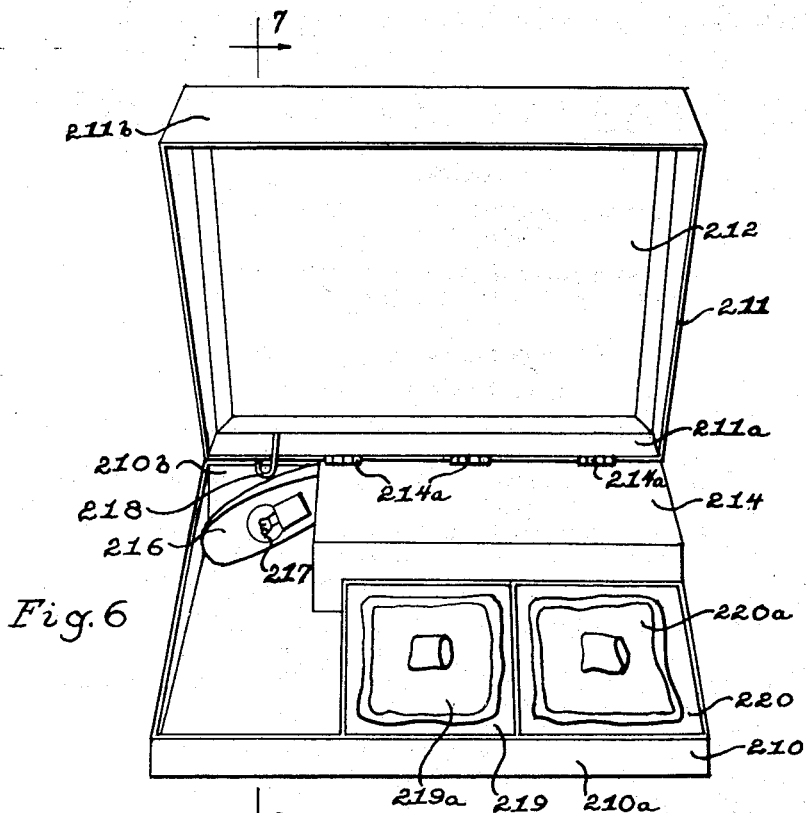
Figure 6 is a perspective view of a modification.

Referring particularly to Figures 1 to 3, 10 designates the body portion of the vanity box which is made of a convenient size to be held in the hand or to be carried in a lady's pocket book or in the pocket of an automobile body.

Due to the fact that ladies in using vanity boxes, may and frequently do wish to use the box, where proper lighting is not available, as in the evening while traveling in an automobile; I have provided a light in the shape of the electric lamp 11. This electric lamp is provided with a suitable reflecting surface of paint, nickel or silver, so located as to reflect light from the lamp 11 onto the face of the user and preferably so that practically a very little, if any, light will be sent toward the mirror 12 which is preferably located on the lid 13. Such a reflecting surface is illustrated as located on a reflector 14 of suitable shape and proportions as to be located in a recess in the box 10. This is illustrated in Figures 1 and 2. To furnish a source of electrical energy, I provide two means. A socket 15 is provided for connection to a plug 15ª which may be connected to a dry cell concealed in any appropriate place or it may be connected to the storage battery of an automobile. In addition, I provide in an adjacent recess, clips 16, 17 secured to the end recess walls in position to resiliently hold small dry cells 18 in place, to supply the electric current in case the user does not desire to use the connector 15 and plug 15ª, as when the vanity box is carried in a hand bag Referring particularly to Figure 3 where the diagrammatic showing of wiring is illustrated, it will be seen that when using the dry cells for a source of current, the current will pass from the hand switch 19 through the lamp 11 to the clip 17 through the cells 18, the clip 16 to the switch 20 to the switch 19. The switch 20 is illustrated as being open in Figure 3. The switch arm 20 is resilient and is moved by the lid 13 to and from the contact member 20ᵃ. When the lid is raised the contact member 20 reaches the contact member 20ᵃ and closes the circuit. When the lid is closed, the circuit is opened. This insures that the light will be extinguished when the lid is closed. Suitable means should be provided to stop the lid from going too far to the rear.

To provide for the cosmetics one or more recesses should be provided. As illustrated, I have shown a long narrow recess 21 as for the lipstick and recesses 22, 23, 24 as for powder, rouge and cleaning cloth, respectively.

In use, the lighting feature could be made inoperative, as by operation of the switch 19 illustrated on the side of the recess containing the lamp, as illustrated in Figure 2.

In the form shown in Figures 4 and 5, a slightly different arrangement is illustrated. The lamp 111 is shown in the rear recess of the vanity box body 110. The mirror 112 is mounted in the lid 113.

The pivoted reflector 114 carries the lamp 111 and is so arranged that when it is moved to the position shown in Figure 4, contact with the battery will be established to light the lamp and throw out the light, to illuminate the face of the user.

At the end of the body portion 110, there is a recess to receive the lip stick 121 and in the forward part of the body portion are located two recesses 122, 123, as to receive powder and rouge.

In Figure 5 is illustrated the position assumed by the battery and reflector. This insures the throwing of the light in the proper direction to illuminate the face of the user.

Preferably, I provide a cover 18ᵃ in the device illustrated in Figures 1 to 3. This cover encloses the dry cells or closes the dry cell recess in case the dry cells are not used. This cover 18ᵃ furnishes a convenient rest for the left thumb while the right hand is being used to apply the cosmetics.

Referring now to Figures 6, 7, and 8, 210 designates the body portion of a vanity box of slightly different construction from those already described. At the rear of the vanity box body 210, is hinged a cover member 211 having a mirror 212 therein. The forward face of the main body 210 of the vanity box, is lower than the opposite rear face which I have designated 210ᵇ and the forward faces 210ᵃ. In the same way, the rear face 211ᵃ of the cover has a less height than the height of the forward face 211ᵇ of the cover.

Figure 7:
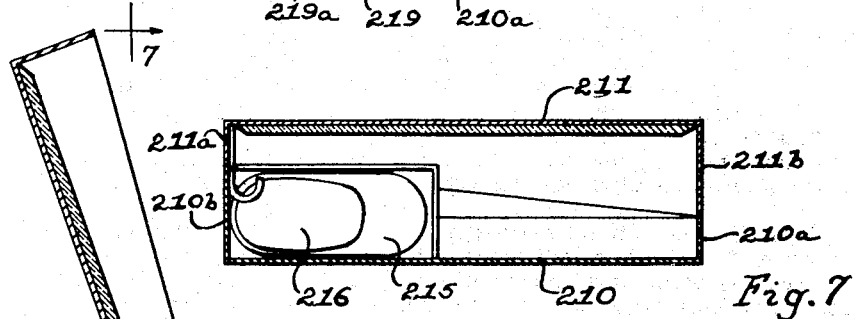
Figures 7 and 8 are sectional views on the line 7—7 of Figure 6 in closed and open positions, respectively.
Figure 8:
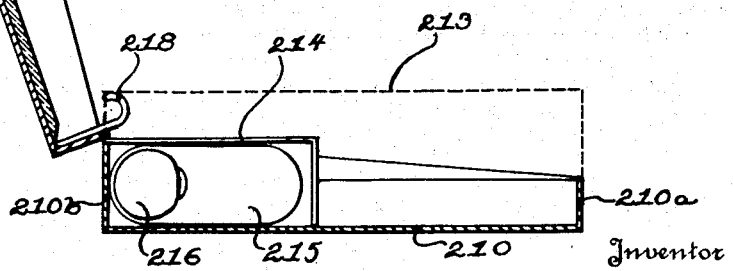

In Figure 7, it will be noted that the main body 210 and its cover 211 are complementary to each other and form a position of uniform thickness as shown by the dotted lines 213 in Figure 8 and by the cross section shown in Figure 7. At the rear of the box is located a compartment over which is a cover 214. This cover is hinged at its rear edge as shown at 214ᵃ.

Withing this compartment is placed an electric light unit 215 which is upon the market and which has a mirrored lid 216, which lid carries a light 217. This light 217 is controlled by an interior switch which is operated by the pivotal movement of the lid 216. When the lid is opened to expose the light 217, the switch is operated to place the lamp in electrical connection with the battery within the light unit 215.

It will be noted that the lid 216 may be placed in an entirely closed position and in this position the movement in opening or closing the cover 211 will have no effect whatever upon the lighting circuit. These would be the conditions for use of the device in the daytime where plenty of light was expected to be available.

In order, however, to make the device suitable for intermittent use in places where the lights are not so bright, as an automobile, I have provided a connection to the light in the form of a projection 218 which extends to a point where it will engage the lid 216 if the latter is opened. The projection is so shaped that when the lid is opened no contact between the projection 218 and 216 will be made. When, however, the cover 211 is closed then the projection 218 will move the lid 216 in a closing direction for a short distance. This distance is sufficient to open the switch to the electric light 217 and cause the same to be disconnected from its battery.

The resultant action is that the cover 211 will open the circuit of the electric light when it is closed and will close the circuit when the cover 211 is opened. In this way a light is always provided when needed and no light is provided when none is needed.

It will be noted that there is an unobstructed path between the light 217 and the face of the user as shown in Figure 6.

At the right of this unobstructed path in the modification shown in Figure 6, I have illustrated two compartments, 219 and 220 in which are the pads 219ᵃ and 220ᵃ. These compartments and pads are for the use of different kinds of cosmetics, as for example powder and rouge, respectively.

Figure 9:
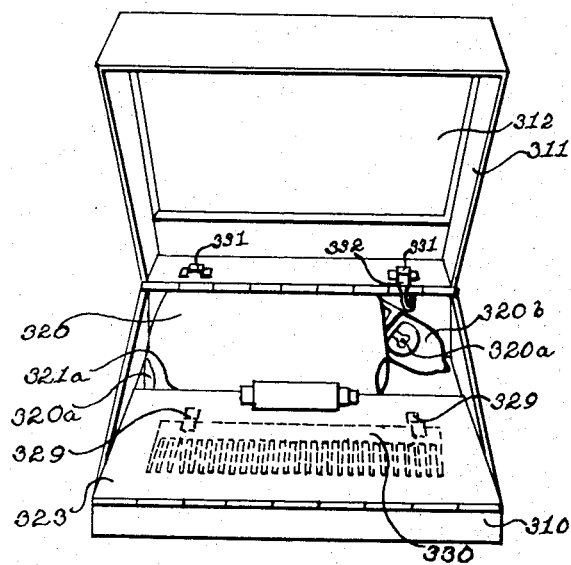
Figures 9 and 10 are perspective views of another modification.
Figures 10, 11:
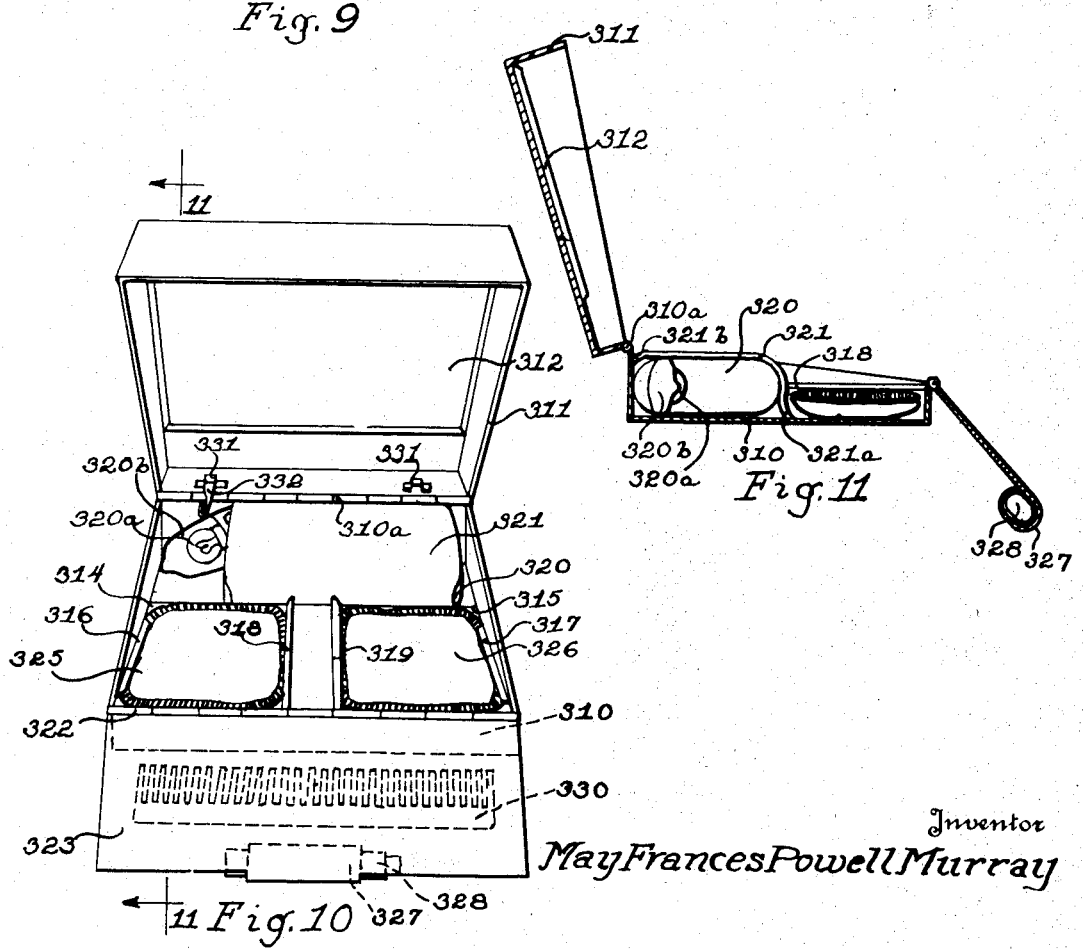
Figure 11 is a sectional view on the line 11—11 of Figure 10.

Referring now to Figures 9, 10 and 11, in which is illustrated another embodiment, 310 and 311 designate respectively, the main body and cover of the vanity box having a mirror 312 in the cover. The shapes of the main body 310 and its cover 311 are preferably similar to the corresponding parts 210 and 211 of Figure 6 and are complementary to each other.

The modification shown in Figures 9, 10 and 11 have several important features not illustrated in the other modifications. The forward portion of the box is divided into two sections, 314 and 315, these sections being for the reception of small pans of cosmestics such as are available on the market and which are known as "refills".

These pans are held in place by outer guides 316 and 317 and by inner guides 318 and 319.

To hold the electric light unit 320 in place, I have provided a cover 321, which cover 321 is preferably resilient and held in place by inserting its lower front end 321ᵃ under the guides 318 and 319 and then by snapping its upper rear edge 321ᵇ underneath the hinge 310ᵃ, which hinge pivots the cover 311 to the main body 310. The electric light unit 320, is provided with a light member 320ᵃ and a lid 320ᵇ which operates in a manner similar to the light 317 and the lid 216 already described. At the upper edge of the forward face of the main body 310, is hinged at 322 a cover member 323. This cover member 323 acts as a protector for the cosmetics which are shown at 314 and 315. Pads 325 and 326 are illustrated above the cosmetics and are held in place by the cover member 323. It will be also noted that the guides 316, 318 and 319, 317 are so arranged that they may hold the pads 325 and 326 under their edges to prevent accidental dropping of the same when the cover member 323 is opened.

On the top of the cover member 323 may be placed a holder 327 of such form and shape as to receive a lip-stick holder 328.

By comparison of Figure 9 and Figure 10, it will be noted that the electric light unit 320 is placed in oppositely disposed positions in the two figures.

In Figure 9, the arrangement is for a right-handed user, the box being held open and in position to be used and in the left hand. In Figure 10 the arrangement is for holding in the right hand as would be useful for a left-handed user.

On the upper side of the cover member 323 may be placed a comb to be held in place by the clips 329. This comb is shown in dotted lines and is designated 330.

At the rear inner face of the cover 311 are placed two small clips 331. These clips 331 are of a shape to receive a projecting operating finger 332. There is only one operating finger for each vanity box, this operating finger being attached to the clip 331 adjacent the end occupied by the lid end of the lighting unit 320. When in place, it operates in a manner similarly to the operating finger 318 already described.

The foregoing description makes it clear that I have provided a vanity box which carries its own means for illumination of the face and which has its own mirror which is adjustable relatively to the illuminating light with the cosmetics compartments conveniently arranged for immediate use.

While details of the invention are shown and described, it is to be understood that the invention is not limited to the details disclosed and that modifications and changes may be made without departing from the spirit of the invention and within the scope of the appended claim.

Having described my invention what I claim and desire to secure by Letters Patent is:

A hand vanity box comprising a body portion, a lid, a mirror on the lid, an elongated removable electric light and battery unit having a light source and cooperating reflector at one end thereof, means in the body portion adapted to support the unit transversely of the body portion with the light source and reflector at either side of the box, whereby the assembly is adapted for either a right or left handed user.

MAY FRANCES POWELL MURRAY.